United States Patent [19]
Shimada

[11] Patent Number: 5,130,864

[45] Date of Patent: Jul. 14, 1992

[54] DIGITAL RECORDING AND REPRODUCING APPARATUS OR DIGITAL RECORDING APPARATUS

[75] Inventor: Hiromichi Shimada, Nishinomiya, Japan

[73] Assignee: Matsushita Electric Industrial Co., Ltd., Osaka, Japan

[21] Appl. No.: 592,536

[22] Filed: Oct. 3, 1990

[30] Foreign Application Priority Data

Oct. 11, 1989 [JP] Japan .................................. 1-264370
Oct. 13, 1989 [JP] Japan .................................. 1-266467

[51] Int. Cl.$^5$ ............................................. G11B 5/09
[52] U.S. Cl. ......................................... 360/60; 360/32
[58] Field of Search ......................... 360/32, 60, 61, 15

[56] References Cited

FOREIGN PATENT DOCUMENTS 0328141 8/1989 European Pat. Off. .
1-13260 1/1989 Japan .
2-134769 5/1990 Japan .

OTHER PUBLICATIONS

J. Watkinson, "Compact disc mastering," Electronics and Wireless World, vol. 92, No. 1600, pp. 47–62, Feb. 1986.

*Primary Examiner*—Vincent P. Canney
*Attorney, Agent, or Firm*—Stevens, Davis, Miller & Mosher

[57] ABSTRACT

The invention includes an A/D converter, a digital input, decoder for demodulating a signal supplied to a digital input terminal to decode it into respective blocks of data, a digital copy control signal detecting portion for detecting a digital copy control signal from a channel status signal in an output signal of the digital input decoder, a digital copy permissibility decision portion for deciding whether digital copying is permissible or not, according to an output of the digital copy control signal detecting portion, a recording signal selecting portion for selecting one of an output signal of the A/D converter and an output signal of the digital input decoder and supplying the selected signal to a recording signal processing circuit, a first selection switch for selecting one of an output signal of a reproduced signal processing circuit and an output signal of the digital input decoder and supplying the selected signal to a D/A converter, and a second selection switch for selecting one of an output signal of the D/A converter and a signal supplied to an analog signal input terminal and supplying the selected signal to the A/D converter, whereby even in the digital recording mode, when the digital copying permissibility decision portion decides that digital copying is impermissible, the recording signal selecting portion selects an output signal of the A/D converter, the first selection switch selects an output signal of the digital input decoder, and the second selection switch selects the output signal of the D/A converter, so that a change is made from the digital recording mode to the analog recording mode, and thus a continuous recording is made.

6 Claims, 5 Drawing Sheets

DIGITAL RECORDING AND REPRODUCING APPARATUS OR DIGITAL RECORDING APPARATUS

BACKGROUND OF THE INVENTION

This invention relates to digital recording and reproducing apparatus or digital recording apparatus such as a digital audio tape recorder capable of converting an analog signal into a digital signal and recording the digital signal or directly recording a digital signal without conversion.

Recently, the development of digital audio apparatus has been advanced, and digital recording and reproducing apparatus or digital recording apparatus such as digital audio tape recorders (hereinafter, referred to as DATs) have been put to practical use which is capable of converting signals from conventional analog apparatus into digital signals and recording the digital signals or transferring and recording signals from a digital apparatus in accordance with a digital interface format.

In the conventional DAT, the user can record any one of an analog input signal and a digital input signal by use of an operation switch. However, when the user tries to record a digital signal according to a digital audio interface format, copying is sometimes impossible because of a category code and copy inhibition bit included in the digital audio interface signal (see Japanese Patent Application No. 54269/1988 filed on Mar. 8, 1988).

To solve this problem, a DAT has been proposed in which when a copy inhibition signal is inputted upon starting the digital recording or during digital recording, an input signal to the analog input terminal is converted into a digital signal and recorded (see JP-A-13260/89).

In this proposed DAT, however, a signal from the same source as the digital signal must be supplied to the analog input, and the level of the signal inputted through the analog input terminal is required to be adjusted before being supplied to an A/D converter. Moreover, it is impossible to record a signal from the apparatus having no analog output terminal but only a digital output terminal.

In addition, the user is required to be informed of whether a signal supplied to the analog input terminal is recorded, whether a signal supplied to the digital input terminal is recorded or whether a signal supplied to the digital terminal is converted into an analog signal, and further converted into a digital signal and then recorded.

Furthermore, upon performing digital recording, precise information on music intervals can be obtained from the user data included in the digital audio interface signal; however, in analog recording, the original music interval information cannot be properly utilized because a music interval is detected by way of the signal level and the elapsed time.

SUMMARY OF THE INVENTION

An object of the present invention, in view of the above problems, is to provide a digital recording and reproducing apparatus or digital recording apparatus capable of recording even the signal from the apparatus with only a digital output terminal irrespective of whether a copy inhibition signal is present or not, requiring no level adjustment, and being sure to detect music intervals from the user data included in the digital audio interface signal.

According to this invention, there is provided a digital recording and reproducing apparatus or digital recording apparatus comprising an analog to digital (A/D) converter for converting an analog signal into a digital signal, a digital input decoder for demodulating a signal supplied to a digital input terminal, thus decoding the signal into blocks of data, a digital copy control signal detecting portion for detecting a digital copy control signal from a channel status signal from the digital input decoder, a digital copy permissibility decision portion for deciding whether digital copying is permissible or not from an output signal from the digital copy control signal detecting portion, a recording signal selection portion for selecting one of a signal from the A/D converter and a signal from the digital input decoder and supplying the selected signal to a recording signal processing circuit, a digital to analog (D/A) converter for converting a digital signal into an analog signal, a first selection switch for selecting one of a signal from a reproduced signal processing circuit and a signal from the digital input decoder and supplying the selected signal to the D/A converter, and a second selection switch for selecting one of an output signal of the D/A converter and a signal supplied to an analog input terminal and supplying the selected signal to the A/D converter. Thus, according to the digital recording and reproducing apparatus of this invention, when the digital copy permissibility decision portion decides that a digital copy is impermissible even in the digital recording mode, the recording signal selection portion selects the output signal of the A/D converter, and the second selection switch selects the output signal of the D/A converter, thus switching from a digital copying mode to an analog recording mode, so that a continuous recording is made.

Moreover, according to this invention, there is provided a digital recording and reproducing apparatus or digital recording apparatus comprising a digital input terminal, a digital input decoder for demodulating a signal supplied to the digital input terminal, thereby decoding the signal into blocks of data, a D/A converter for converting a digital signal into an analog signal, an A/D converter for converting an analog signal into a digital signal, a digital copy control signal detection portion for detecting a digital copy control signal from a channel status signal from the digital input decoder, a digital copy permissibility decision portion for deciding, according to an output signal of the digital copy control signal detecting portion, whether digital copying is permissible or not, and a recording signal selection portion for selecting one of an output signal of the digital input decoder and an output signal of the A/D converter, whereby when the digital copy permissibility decision portion decides that a digital copy is impermissible, the recording signal selection portion selects an output signal which is produced by the digital input decoder, converted into an analog signal by the D/A converter and converted into a digital signal by the A/D converter, so that even when the digital copy permissibility decision portion decides that digital copying is impermissible, continuous recording is possible by switching from a digital copying mode to an analog recording mode.

Also, according to this invention, there is provided a digital recording and reproducing apparatus or recording apparatus comprising an operation switch including a switch for selecting a digital recording mode, a digital input decoder for demodulating a signal supplied to a digital input terminal, thereby decoding the signal into blocks of data, a digital copy control signal detecting portion for detecting a digital copy control signal from a channel status signal from the digital input decoder, a digital copy permissibility decision portion for deciding, according to an output signal of the digital copy control signal detecting portion, whether the digital copying is permissible or not, an A/D converter for converting an analog signal into a digital signal, a recording signal selecting portion for selecting one of an output signal of the A/D converter and an output signal of the digital input decoder and supplying the selected signal to a recording signal processing circuit, a D/A converter for converting a digital signal into an analog signal, and an indicator for indicating at least one of analog recording mode and digital recording mode, whereby a converted analog signal can be recorded at a same level as a digital input signal without adjusting the signal level before being supplied to the A/D converter by virtue of maximum utilization of a dynamic range of the A/D converter.

Moreover, according to this invention, there is provided a digital recording and reproducing apparatus or digital recording apparatus wherein the user can be informed of whether a signal supplied to an analog input terminal is recorded, whether a signal supplied to a digital input terminal is recorded, or whether the signal supplied to the digital input terminal is converted into an analog signal and further converted into a digital signal, and informed of the path through which the recording is made when a digital copy is impermissible.

In addition, according to this invention there is provided a digital recording and reproducing apparatus or digital recording apparatus comprising a digital input terminal, a digital input decoder for demodulating a digital signal supplied to a digital input terminal, thereby decoding the signal into blocks of data, a D/A converter for converting a digital signal into a analog signal, an A/D converter for converting an analog signal from the D/A converter into a digital signal, a music interval signal detecting portion for detecting the music interval from the user data from the digital input decoder, and a subcode encoder for producing from an output signal of the music interval signal detecting portion a subcode indicative of a music interval which is to be recorded on a recording medium, whereby the apparatus of this invention can record a precise music interval information by detecting a music interval information from the user data which is the output of the digital input decoder and producing the subcode indicative of the music interval which is to be recorded on the recording medium even when a converted analog signal is recorded.

Moreover, in a digital recording and reproducing apparatus or digital recording apparatus of this invention, since a D/A converter for converting a digital signal into an analog signal and an A/D converter for converting an analog signal from the D/A converter into a digital signal are operated in synchronism with the same clock signal, the signal which is once converted into an analog signal but again converted into a digital signal can be obtained so as to be very close to the original digital signal. Therefore, the apparatus of this invention causes no deterioration of sound quality due to conversion into an analog signal.

DESCRIPTION OF THE PREFERRED EMBODIMENTS

Figure 1:
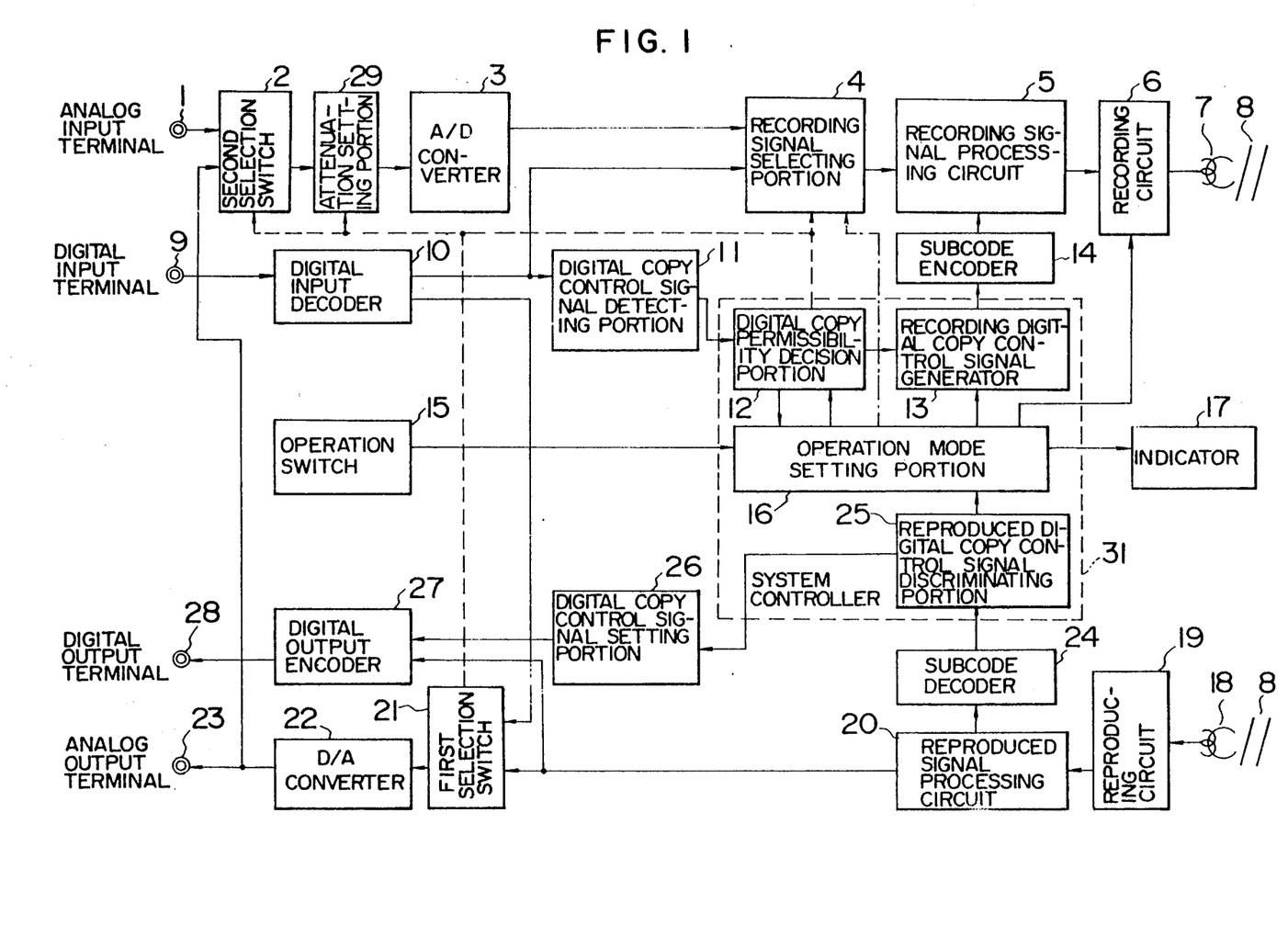
FIG. 1 is a block diagram of the DAT in one embodiment of this invention.

A DAT in one embodiment of this invention will be described with reference to the drawings. FIG. 1 is a block diagram of the DAT in one embodiment of this invention. Referring to FIG. 1, there are shown an analog input terminal 1, a second selection switch 2 for selecting one of an output signal of a D/A converter 22, which will be described later, and a signal supplied to the analog input terminal 1 and supplying the selected signal to an attenuation setting portion 29, which will be described later, with the attenuation setting portion 29 for switching between the position in which attenuation of the analog signal can be continuously changed and the position in which it can be attenuated by a predetermined amount, an A/D converter 3 for converting the analog signal into a digital signal, a signal recording selection portion 4 for selecting one of a signal from the A/D converter 3 and a signal from a digital input decoder 10, which will be described later, and supplying the selected signal to a recording signal processing circuit 5, with the recording signal processing circuit 5 converting audio data from the recording signal selecting portion 4 and subcode data from a subcode encoder 14, which will be described later, into a format in which those data are recorded on a magnetic tape 8, a recording circuit 6 for supplying the processed signal to a recording magnetic head 7, and the magnetic tape 8. In addition, there are shown a digital terminal 9, a digital input decoder 10 for demodulating a signal supplied to the digital input terminal 9 and decoding the same into an audio signal and a channel status signal, a digital copy control signal detecting portion 11 for detecting a digital copy control signal from the channel status signal, a digital copy permissibility decision portion 12 for deciding whether a digital copy is permissible or not according to an output signal of the digital copy control signal detecting portion 11, a recording digital copy control signal generating portion 13 for producing a subcode associated with a digital copy to be recorded on the magnetic tape in accordance with commands from the digital copy permissibility decision portion 12 and from an operation mode control portion, and a subcode encoder 14 for producing a subcode from the output signal of the recording digital copy control signal generating portion 13. Moreover, there are shown an operation switch 15 including a switch for selecting one of the analog recording mode and the digital recording mode, an operation mode setting portion 16 for controlling the operation mode of the DAT by the control signal from the operation switch 15, and an indicator 17 for indicating, e.g. the input mode of the DAT, by lighting an LED for indicating an analog recording mode or lighting another LED for indicating a digital recording mode. Also, there are shown a reproducing circuit 19 for amplifying a signal from the magnetic tape 8, a reproduced signal processing circuit 20 for demodulating the digitally recorded and reproduced signal and decoding the same into a subcode signal and an audio signal, a first selection switch 21 for selecting one of an output signal of the reproduced signal processing circuit 20 and an output signal of the digital input decoder 10 and supplying the selected signal to a D/A converter 22 for converting a digital signal into an analog signal, and an analog output terminal 23 through which the signal from the D/A converter 22 is produced. Moreover, there are shown a subcode decoder 24 for demodulating the subcode from the reproduced signal processing circuit 20, a reproduced digital copy control signal discriminating portion 25 for discriminating a digital copy control signal from the output signal of the subcode decoder 24, and a digital copy control signal setting portion 26 for setting a digital copy control signal to be added to the digital output signal from the reproduced digital copy control signal discriminating portion 25. In addition, there are shown a digital output encoder 27 for producing a signal according to the digital audio interface format from the data including audio data in the output signal of the reproduced signal processing circuit 20 and the output signal of the digital copy control signal setting portion 26, and a digital output terminal 28 through which the signal from the digital output encoder 27 is outputted. Moreover, there is shown a system controller 31 including the digital copy permissibility decision portion 12, the recording digital copy control signal generating portion 13, the operation mode setting portion 16 and the reproduced digital copy control signal discriminating portion 25, the system controller 31 being formed of, e.g., a microcomputer.

Figure 2:
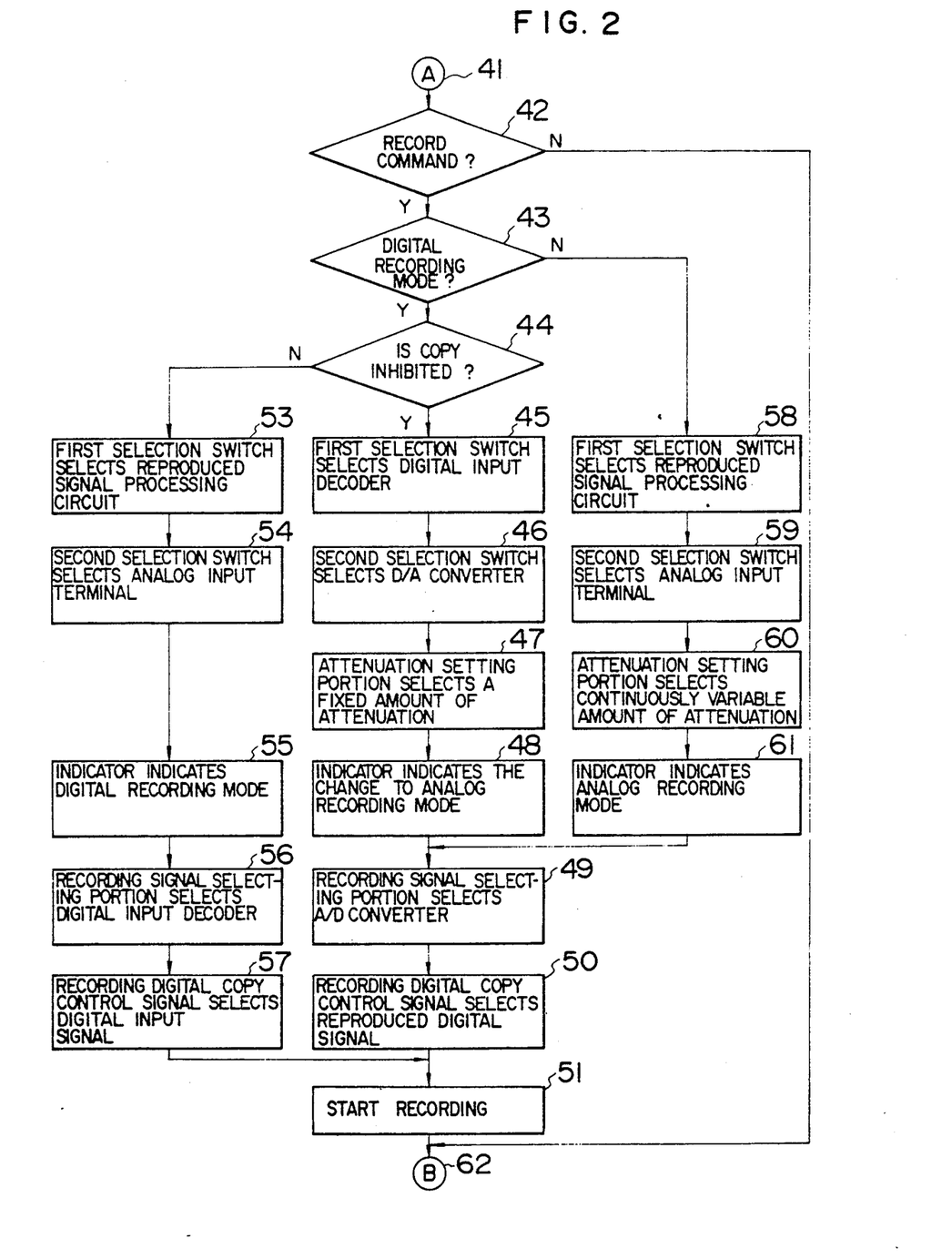
FIG. 2 is a flowchart of a part of the processing in a system controller 31 shown in FIG. 1.

The operation of the DAT constructed as mentioned above will be hereafter described with reference to the drawings. FIG. 2 is a flowchart showing part of the processing performed in the system controller 31.

A description will first be made of the case in which a digital signal from a CD (compact disk) player is recorded by the DAT where a digital copy is permissible. When the input selection switch in the operation switch 15 is turned over to the digital recording mode position, and when the recording start switch is pushed, the operation mode setting portion 16 of the system controller 31 identifies a recording command at a decision step 42, a digital recording mode at a step 43, and then proceeds to a step 44. At the decision step 44, the digital copy control signal detecting portion 11 detects a copy inhibition bit and a category code of the CD from the channel status signal of the digital input decoder 10 and the digital copy permissibility decision portion 12 decides that copying is permissible. As a result, at processing steps 53 to 57, the first selection switch 21 selects the output of the reproduced signal processing circuit 20, the second selection switch 2 selects the analog input terminal 1, the indicator 17 lights the LED to indicate the digital recording mode, the recording signal selecting portion 4 selects the digital input decoder 10, and the operation mode setting portion 16 controls the recording digital copy control signal generating portion 13 to supply a signal indicating that copying of the reproduced digital output signal is inhibited to the subcode encoder 14. At a processing step 51, the operation mode setting portion 16 functions to control starting of the recording operation.

A description will now be made of a case in which digital copying by the DAT from a tape, on which the contents of a CD (whose digital copying is inhibited) are digitally copied, is tried. Namely, this constitutes a situation in which digital copying is impermissible. When the input selection switch is turned over to the digital position, and when the recording start switch is pushed, the operation mode setting portion 16 of the system controller 31 identifies the record command at the decision step 42, the digital recording mode at the decision step 43, and then proceeds to the decision step 44. At the decision step 44, the digital copy control signal detecting portion 11 detects a copy inhibition bit and a category code of DAT from the channel status signal from the digital input decoder 10, and the digital copy permissibility decision portion 12 decides that copying is impermissible. As a result, at the processing step 45, the first selection switch 21 selects the digital input decoder 10, and at the processing step 46 the second selection switch 2 selects the D/A converter 22. At the processing step 47, an attenuation setting portion 29 sets the level of the analog signal from the D/A converter 22 so that, e.g., the digital signal indicating an audio output level of "0 dB" from the digital input decoder 10, is converted into an analog signal by the D/A converter 22, and then a digital signal of "0 dB" is obtained when the analog signal is converted into the digital signal by the A/D converter 3. At the processing step 48, the indicator 17 controls the analog indicating LED and the digital indicating LED to alternately blink to indicate a change to the analog recording mode from the digital recording mode which the user has set, under the control of the operation mode setting portion 16. At the processing steps 49 and 50, the recording signal selecting portion 4 selects the A/D converter 3, and the recording digital copy control signal setting portion 13 is controlled by the operation mode setting portion 16 so that the setting portion 13 can supply to the subcode encoder 14 a signal that permits the reproduced digital output signal to be copied only once. At the processing step 51, the operation mode setting portion 16 functions to control starting of the recording operation.

Thus, a digital signal which cannot normally be recorded is converted into an analog signal within the DAT, and can be recorded at the same level as in the digital copy mode.

A description will now be made of the case in which the signal supplied to the analog input terminal 1 is converted into a digital signal by the A/D converter 3, and then recorded. When the input selection switch is turned over to the analog position, and when the recording start switch is pushed, the operation mode setting portion 16 of the system controller 31 identifies the record command at the decision step 42, the analog recording mode at the decision step 43, and then proceeds to the processing step 58. At the processing steps 58 to 61, the first selection switch 21 selects the reproduced signal processing circuit 20, the second selection switch 2 selects the analog input terminal 1, the attenuation setting portion 29 selects the circuit which is capable of continuously attenuating the input signal level to obtain the optimum recording level, and the indicator 17 controls the LED to indicate the analog recording mode under the control of the operation mode setting portion 16. At the processing steps 49 and 50, the recording signal selecting portion 4 selects the A/D converter 3, and the recording digital copy control signal generating portion 13 supplies to the subcode encoder 14 a signal that permits the reproduced digital output signal to be copied only once in the digital form under the control of the operation mode setting portion 16. At the processing step 51, the operation mode setting portion 16 functions to control starting of the recording operation.

According to this embodiment, as described above, a decision is made as to whether the digital copying is permissible or not, and when the digital copying is impermissible, the digital signal is converted into an analog signal and further converted into a digital signal of the same signal level before being recorded. Thus, the user of the DAT can record any signal. Moreover, since the A/D converter and D/A converter are used within the DAT, any signal can be recorded at the same level as upon digital recording at a fixed level. Also, even when the DAT user sets the digital copy mode, the indicator indicates that the analog recording mode has been selected.

Figure 3:
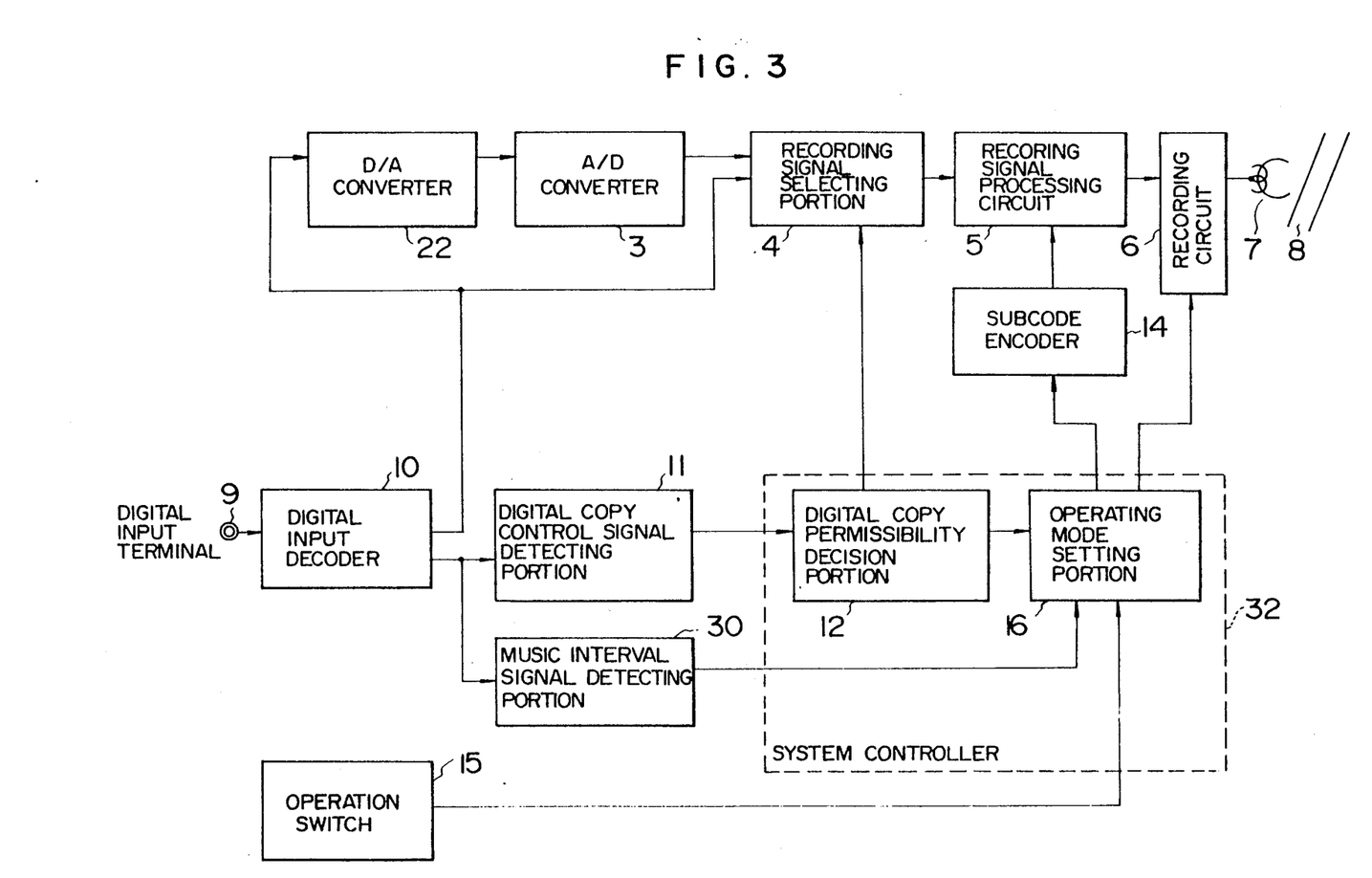
FIG. 3 is a block diagram of the DAT in a second embodiment of this invention.

A second embodiment of the invention will be described with reference to FIG. 3. FIG. 3 is a block diagram of the DAT of the second embodiment of this invention. Referring to FIG. 3, there are shown a digital input terminal 9, a digital input decoder 10 for demodulating a signal supplied to the digital input terminal 9 and decoding the same into an audio signal and a subcode signal, a D/A converter 22 for converting a digital signal from the digital input decoder 10 into an analog signal, with the A/D converter 3 converting an analog signal from the D/A converter 22 into a digital signal, the recording signal selecting portion 4 for selecting one of an output signal of the A/D converter 3 and an output signal of the digital input decoder 10 and supplying the selected signal to a recording signal processing circuit 5, the recording signal processing circuit 5 for converting the audio data from the recording signal selecting portion 4 and a subcode data from a subcode encoder 14, which will be described later, into the format suitable for being recorded on the magnetic tape 8, a recording circuit 6 for supplying the processed signal to a recording magnetic head 7, and a magnetic tape 8. Moreover, there are shown a digital copy control signal detecting portion 11 for detecting a digital copy control signal from a channel status signal of the subcode signal from the digital input decoder 10, a digital copy permissibility decision portion 12 for deciding whether a digital copy is permissible or not according to the output signal of the digital copy control signal detecting portion 11, a music interval signal detecting portion 30 for detecting a music interval from the user data of the subcode signal from the digital input decoder 10, an operation mode setting portion 16 for controlling the operation mode of the DAT in response to the signal from an operation switch 15, the operation switch 15 including at least a recording start switch for starting the recording, and the subcode encoder 14 for producing the subcode from the output signal of the operation mode setting portion 16 and the output signal of the music interval signal detecting portion 30. Also, there is shown a system controller including the digital copy permissibility decision portion 12 and the operation mode setting portion 16, the system controller being formed of, e.g., a microcomputer.

Figure 4:
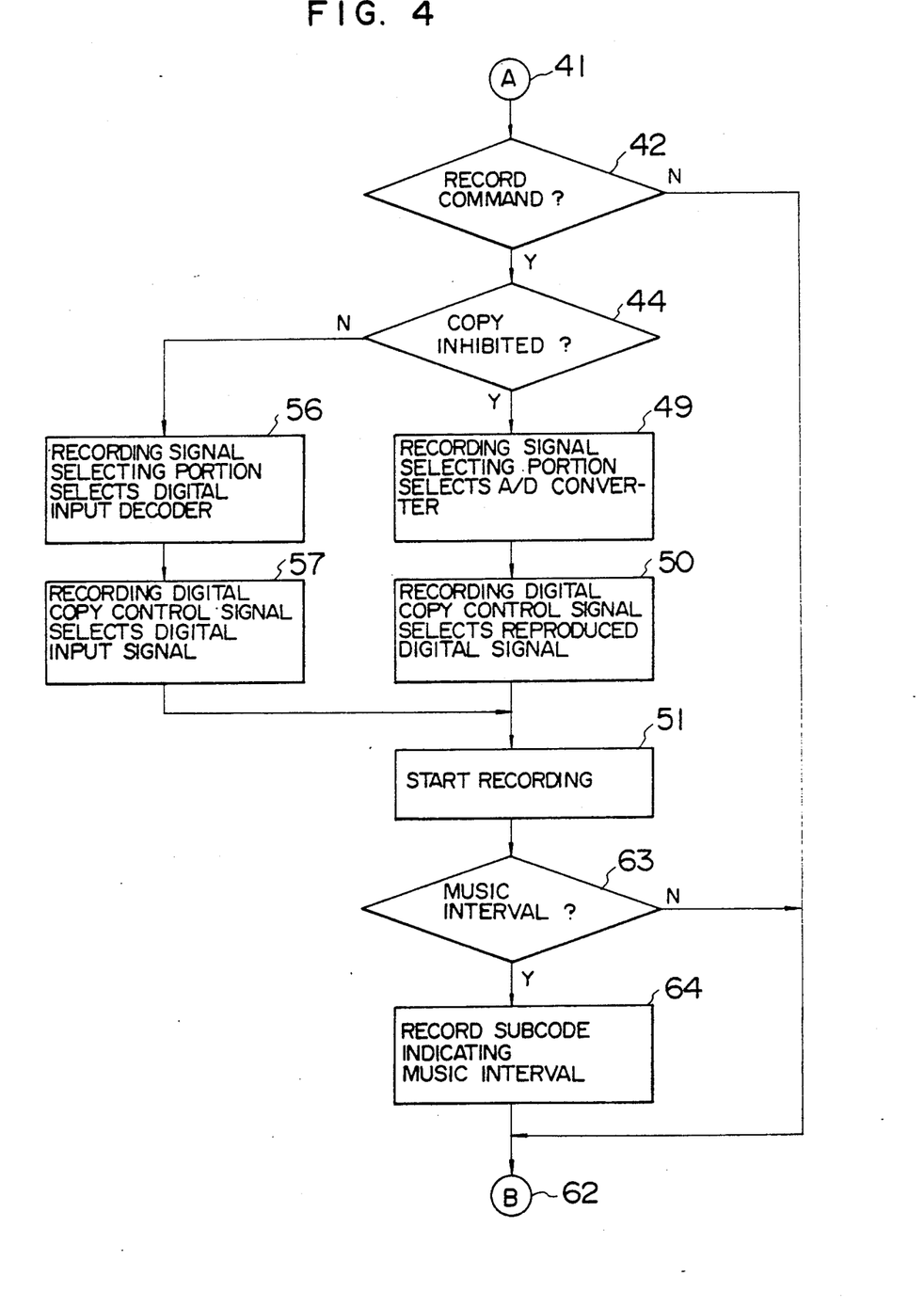
FIG. 4 is a flowchart of a part of the processing in a system controller 32 shown in FIG. 3.

The operation of the DAT mentioned above will be described with reference to the drawings. FIG. 4 is a flowchart showing part of the processing operation of the system controller 32.

A description will be made of the case in which a signal from a CD player is digitally copied by the DAT namely, the case in which digital copying is permissible. When the recording start switch of the operation switch 15 is pushed, the operation mode setting portion 16 of the system controller 32 identifies the record command at a decision step 42, and at a decision step 44, the digital copy control signal detecting portion 11 detects the copy inhibition bit and the category code of a CD from the channel status signal from the digital input decoder 10, and the digital copy permissibility decision portion 12 decides that copying is permissible. As a result, at processing steps 56 and 57, the recording signal selecting portion 4 selects the output signal of the digital input decoder 10, and the recording digital copy control signal generating portion 13 supplies to the subcode encoder 14 a signal for disabling the reproduced digital output signal to be copied under the control of the operation mode setting portion 16. At a processing step 51, the operation mode setting portion 16 controls starting of the recording operation. At a decision step 63, the operation mode setting portion 16 checks the output signal of the music interval signal detecting portion 30. If a music interval is detected, the processing goes to a processing step 64, where a subcode indicative of the music interval, e.g., a start ID, is recorded for a predetermined time.

A description will now be made of a case in which digital copying by the DAT from a tape, on which the contents of a CD (whose digital copying is inhibited) are digitally copied, is tried. Namely, this constitutes a situation in which digital copying is not possible. When the recording start switch is pushed, the operation mode setting portion 16 of the system controller 32 identifies the record command at the decision step 42, and proceeds to the decision step 44. At the decision step 44, the digital copy control signal detecting portion 11 detects the copy inhibition bit and the category code of the DAT from the channel status signal of the subcode which is an output signal of the digital input decoder 10, and the digital copy permissibility decision portion 12 decides that copying is impermissible. As a result, at the processing steps 49 and 50, the recording signal selecting portion 4 selects the A/D converter 3. In other words, the digital signal supplied to the digital input terminal 9 is demodulated by the digital input decoder 10, and the demodulated digital signal is converted by the D/A converter 22 into an analog signal. The analog signal from the D/A converter 22 is converted by the A/D converter 3 into a digital signal, which is selected and supplied to the recording signal processing circuit 5. Moreover, the subcode encoder 14 is supplied with a signal that permits the reproduced digital output signal to be copied only once in the digital form under the control of the operation mode setting portion 16. At the processing step 51, the operation mode setting portion 16 controls starting of the recording operation. In addition, at the decision step 63, the operation mode setting portion 16 checks the output signal from the music interval signal selecting portion 30. When a music interval is detected, the processing goes to the processing step 64, where a subcode indicative of the music interval, e.g., a start ID, is recorded for a predetermined time.

Figure 5:
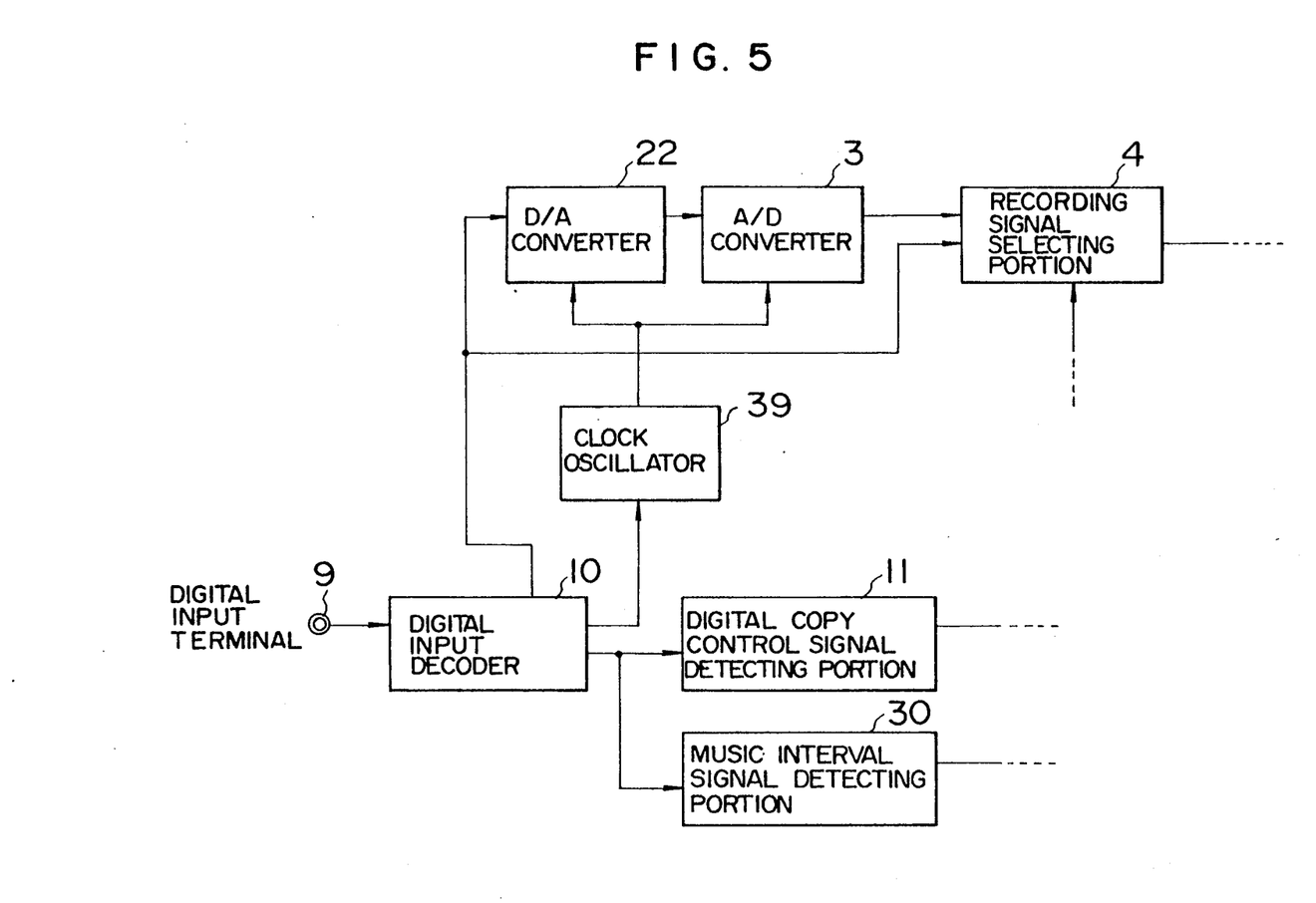
FIG. 5 is a block diagram of peripheral circuits of the D/A converter and A/D converter of the second embodiment of this invention.

A third embodiment of this invention will be described with reference to FIG. 5. FIG. 5 is a block diagram of peripheral circuits of the D/A converter 22 and A/D converter 3 of the DAT of the second embodiment of this invention. Referring to FIG. 5, there is shown a clock oscillator 39 which is controlled by the digital input decoder 10. The other portions are constructed in the same way as in FIG. 3 and will not be described.

The digital audio signal supplied to the digital input terminal 9 is decoder by the digital input decoder 10 into a digital signal and a clock signal. The digital signal indicating the audio information is supplied to the D/A converter 22 and to the recording signal selecting portion 4, the subcode signal to the digital copy control signal detecting portion 11 and so on, and the clock signal to the clock signal oscillator 39. The clock signal oscillator 39 produces a clock signal which is supplied to the D/A converter 22 and the A/D converter 3, in order to operate the D/A converter 22 to convert a digital signal into an analog signal, and to operate the A/D converter 3 to convert an analog signal into a digital signal. The digital signal indicating the audio information is converted by the D/A converter 22 into an analog signal in response to the clock signal from the clock signal oscillator 39. This analog signal is converted by the A/D converter 3 into a digital signal in response to the same clock signal as that given to the A/D converter 22 from the clock oscillator 39.

In this embodiment, the D/A converter 22 and the A/D converter 3 are operated in response to the same clock signal from the clock signal oscillator 39, namely, with the same conversion timing. Thus, even if there are conversion errors in the D/A and A/D converters, if the conversion error in the D/A converter 22 is identical to that in the A/D converter 3, the identical digital signal to the input signal to the D/A converter 22 can be produced from the A/D converter 3. In other words, even when the digital signal is once converted into an analog signal and then converted into a digital signal, no conversion error is produced. Moreover, since the conversion timing is identical, there is no need to provide a low-pass filter between the D/A converter 22 and the A/D converter 3.

According to this embodiment, since, as described above, a decision is made as to whether digital copying is permissible or not, and since when digital copying is impermissible, the digital signal is converted into an analog signal and then converted into a digital signal, which is then recorded, the user of the DAT can record any signal. Moreover, even in the analog recording mode, since a music interval is detected from the user data which is an output signal of the digital input decoder 10, and the subcode indicative of the music interval is produced to be recorded on the tape, precise music interval information can be recorded.

I claim:

1. A digital recording and reproducing apparatus comprising:
   an analog input terminal;
   a digital input terminal;
   an analog to digital (A/D) converter for converting an analog signal into a digital signal;
   a digital input decoder for demodulating a signal supplied to said digital input terminal to decode it into respective blocks of data;
   a digital copy control signal detecting portion for detecting a digital copy control signal from a channel status signal in an output signal of said digital input decoder;
   a digital copy permissibility decision portion for deciding whether digital copying is permissible or not, according to an output signal of said digital copy control signal detecting portion;
   a recording signal selecting portion for selecting one of a signal from said A/D converter and a signal from said digital input decoder and supplying the selected signal to a recording signal processing circuit;
   a digital to analog (D/A) converter for converting a digital signal into an analog signal;
   a first selection switch for selecting one of an output signal of a reproduced signal processing circuit and an output signal of said digital input decoder and supplying the selected signal to said D/A converter;
   a second selection switch for selecting one of an output signal of said D/A converter and a signal supplied to said analog input terminal and supplying the selected signal to said A/D converter; and
   an operation switch including a switch for selecting one of a digital recording mode and an analog recording mode;
   wherein when said operation switch is set to the digital recording mode position, and when said digital copy permissibility decision portion decides that a digital copy is impermissible, said recording signal selecting portion selects the output signal of said AD converter, said first selection switch selects the output signal of said digital input decoder, and said second selection switch selects the output signal of said D/A converter.

2. A digital recording and reproducing apparatus comprising:
   a digital input terminal;
   a digital to analog (D/A) converter for converting a digital signal supplied to said digital input terminal into an analog signal;
   an analog to digital (A/D) converter for converting the analog signal from said D/A converter into a digital signal;
   an attenuation setting portion for setting attenuation of the analog signal so that the level of the signal supplied via said digital input terminal, said D/A converter and said A/D converter is equal to that of the signal supplied to said digital input terminal.

3. A digital recording and reproducing apparatus comprising:
   an operation switch including a switch for selecting a digital recording mode;
   a digital input decoder for demodulating a signal supplied to a digital input terminal to decode the same into respective blocks of data;
   a digital copy control signal detecting portion for detecting a digital copy control signal from a channel status signal in an output signal of said digital input decoder;
   a digital copy permissibility decision portion for deciding whether a digital copy is permissible or not, according to an output signal of said digital copy control signal detecting portion;
   an analog to digital (A/D) converter for converting an analog signal into a digital signal;
   a recording signal selecting portion for selecting one of an output signal of said A/D converter and an output signal of said digital input decoder and supplying the selected signal to a recording signal processing circuit;
   a digital to analog (D/A) converter for converting a digital signal into an analog signal; and an indicator for indicating at least one of an analog recording mode and a digital recording mode;

wherein when said operation switch is set to the digital recording mode position, and when said digital copy permissibility decision portion decides that a digital copy is impermissible, a signal supplied to said digital input terminal is converted by said D/A converter into an analog signal and converted by said A/D converter into a digital signal which is then recorded, and said indicator indicates that a change is made from the digital recording mode to the analog recording mode.

4. A digital recording apparatus comprising:

a digital input terminal;

a digital input decoder for demodulating a signal supplied to said digital input terminal to decode the same into respective blocks of data;

a digital to analog (D/A) converter for converting a digital signal into an analog signal;

an analog to digital (A/D) converter for converting an analog signal into a digital signal;

a digital copy control signal detecting portion for detecting a digital copy control signal from a channel status signal in an output signal of said digital input decoder;

a digital copy permissibility decision portion for deciding whether a digital copy is permissible or not, according to an output signal of said digital copy control signal detecting portion; and a recording signal selecting portion for selecting one of an output signal of said digital input decoder and an output signal of said A/D converter;

wherein when said digital copy permissibility decision portion decides that a digital copy is impermissible, said recording signal selecting portion selects an output signal of said A/D converter to which the output signal of said digital input decoder is supplied through said D/A converter.

5. A digital recording apparatus comprising:

a digital input terminal;

a digital input decoder for demodulating a digital signal supplied to said digital input terminal to decode the same into respective blocks of data;

a digital to analog (D/A) converter for converting a digital signal into an analog signal;

an analog to digital (A/D) converter for converting the analog signal from said D/A converter into a digital signal;

a music interval signal detecting portion for detecting a music interval from user data in an output signal of said digital input decoder; and a subcode encoder for producing a subcode indicative of the music interval to be recorded on a recording medium, according to an output signal of said music interval signal detecting portion;

wherein a signal supplied via said digital input terminal, said D/A converter and said A/D converter is recorded, and a subcode signal indicative of a music interval, which is produced according to an output signal of said music interval signal detecting portion, is recorded.

6. A digital recording apparatus comprising:

a digital input decoder for demodulating a signal supplied to a digital input terminal to decode the same into respective blocks of data;

a digital to analog (D/A) converter for converting a digital signal into an analog signal;

an analog to digital (A/D) converter for converting an analog signal into a digital signal; and a clock oscillator which is controlled by said digital input decoder;

wherein said D/A converter and said A/D converted are controlled by the same output signal of said clock oscillator, said D/A converter converting the digital signal demodulated by said digital input decoder into an analog signal, and said A/D converter converting said analog signal into a digital signal.

* * * * *